(12) United States Patent
Chen

(10) Patent No.: US 11,533,426 B2
(45) Date of Patent: Dec. 20, 2022

(54) WATERPROOF SHOT AND ZOOM BUTTON

(71) Applicant: GoPro, Inc., San Mateo, CA (US)

(72) Inventor: Chao Chen, San Mateo, CA (US)

(73) Assignee: GoPro, Inc., San Mateo, CA (US)

(*) Notice: Subject to any disclaimer, the term of this patent is extended or adjusted under 35 U.S.C. 154(b) by 0 days.

(21) Appl. No.: 17/527,773

(22) Filed: Nov. 16, 2021

(65) Prior Publication Data

US 2022/0078334 A1 Mar. 10, 2022

Related U.S. Application Data

(63) Continuation of application No. 17/145,522, filed on Jan. 11, 2021, now Pat. No. 11,218,627.

(60) Provisional application No. 62/960,315, filed on Jan. 13, 2020.

(51) Int. Cl.
*H04N 5/232* (2006.01)
*G03B 17/08* (2021.01)
*H04N 5/225* (2006.01)

(52) U.S. Cl.
CPC ......... *H04N 5/23216* (2013.01); *G03B 17/08* (2013.01); *H04N 5/2252* (2013.01); *H04N 5/23296* (2013.01)

(58) Field of Classification Search
CPC ........... H04N 5/23216; H04N 5/23296; H04N 5/2252; H04N 5/23238; H04N 5/247; G03B 17/08; G03B 9/08; G03B 29/00
USPC .................................................. 348/240.99
See application file for complete search history.

(56) References Cited

U.S. PATENT DOCUMENTS

| | | | | |
|---|---|---|---|---|
| 5,153,622 A | | 10/1992 | Hayakawa | |
| 5,508,766 A | * | 4/1996 | Boyd | G03B 17/08 396/502 |
| 7,385,645 B2 | * | 6/2008 | Boon | G03B 17/08 348/81 |
| 7,426,338 B2 | * | 9/2008 | Matsumoto | H01H 23/143 396/25 |
| 7,598,465 B2 | * | 10/2009 | Hirabayashi | G03B 17/08 200/302.1 |
| 7,633,027 B2 | * | 12/2009 | Sakaguchi | G03B 17/08 200/302.1 |
| 7,789,228 B2 | * | 9/2010 | Zenzai | G03B 17/08 396/27 |
| 8,244,118 B2 | * | 8/2012 | Stansbury | G03B 17/08 396/25 |
| 8,265,469 B2 | * | 9/2012 | Lai | G03B 17/08 396/25 |
| 8,295,895 B2 | | 10/2012 | Obata | |
| 8,378,210 B2 | * | 2/2013 | Taguchi | G03B 17/08 396/419 |

(Continued)

*Primary Examiner* — Pritham D Prabhakher
(74) *Attorney, Agent, or Firm* — Young Basile Hanlon & MacFarlane, P.C.

(57) ABSTRACT

An image capture device including a housing that defines a cavity and a user interface that covers the cavity and has interior and exterior surfaces. The user interface includes an actuation portion that is positioned on the exterior surface and receives an input command from a user. The user interface includes a protrusion that extends from the interior surface and actuates an imaging feature of the image capture device when an input command is received at the actuation portion. The actuation portion and the protrusion in combination prevent premature activation of the input command from hydrostatic pressure.

20 Claims, 10 Drawing Sheets

(56) References Cited

U.S. PATENT DOCUMENTS

| | | | |
|---|---|---|---|
| 8,493,742 B2* | 7/2013 | Li | H01H 13/14 361/752 |
| 9,904,427 B1 | 2/2018 | Co | |
| 9,916,942 B2* | 3/2018 | Shedletsky | H01H 13/06 |
| 10,225,481 B2 | 3/2019 | Tamegai | |
| 10,480,776 B1 | 11/2019 | Fultz | |
| 10,620,591 B2 | 4/2020 | Rothkopf | |
| 10,642,408 B2 | 5/2020 | Mun | |
| 10,761,319 B2 | 9/2020 | Kumar | |
| 10,969,941 B2 | 4/2021 | Bylenok | |
| 10,976,278 B2 | 4/2021 | Chowdhury | |
| 11,042,186 B2 | 6/2021 | Park | |
| 11,218,627 B2 | 1/2022 | Chen | |
| 2005/0168567 A1* | 8/2005 | Boon | H01H 36/0073 348/25 |
| 2006/0113173 A1* | 6/2006 | Matsumoto | H01H 13/06 200/302.2 |
| 2007/0292118 A1 | 12/2007 | Traff | |
| 2008/0308396 A1* | 12/2008 | Matsumoto | H01H 13/06 200/341 |
| 2009/0014297 A1* | 1/2009 | Sakaguchi | H01H 13/06 200/302.2 |
| 2011/0110653 A1* | 5/2011 | Stansbury | G03B 17/08 396/25 |
| 2012/0023450 A1 | 1/2012 | Noto | |
| 2012/0023456 A1* | 1/2012 | Sun | G06T 7/194 715/863 |
| 2012/0236173 A1* | 9/2012 | Telek | G03B 17/08 348/E9.051 |
| 2012/0256867 A1* | 10/2012 | Annacone | G06F 3/044 345/173 |
| 2015/0022481 A1 | 1/2015 | Andersson | |
| 2016/0225551 A1* | 8/2016 | Shedletsky | H03K 17/9625 |
| 2016/0254837 A1 | 9/2016 | Rayner | |
| 2016/0334294 A1 | 11/2016 | Ueno | |
| 2017/0010691 A1 | 1/2017 | Morobishi | |
| 2018/0352121 A1 | 12/2018 | Chapman | |
| 2018/0352927 A1 | 12/2018 | Wang | |
| 2019/0064998 A1 | 2/2019 | Chowdhury | |
| 2019/0095026 A1 | 3/2019 | Smith | |
| 2019/0113743 A1 | 4/2019 | Kumar | |
| 2019/0353985 A1 | 11/2019 | Austin | |
| 2021/0218882 A1 | 7/2021 | Chen | |

* cited by examiner

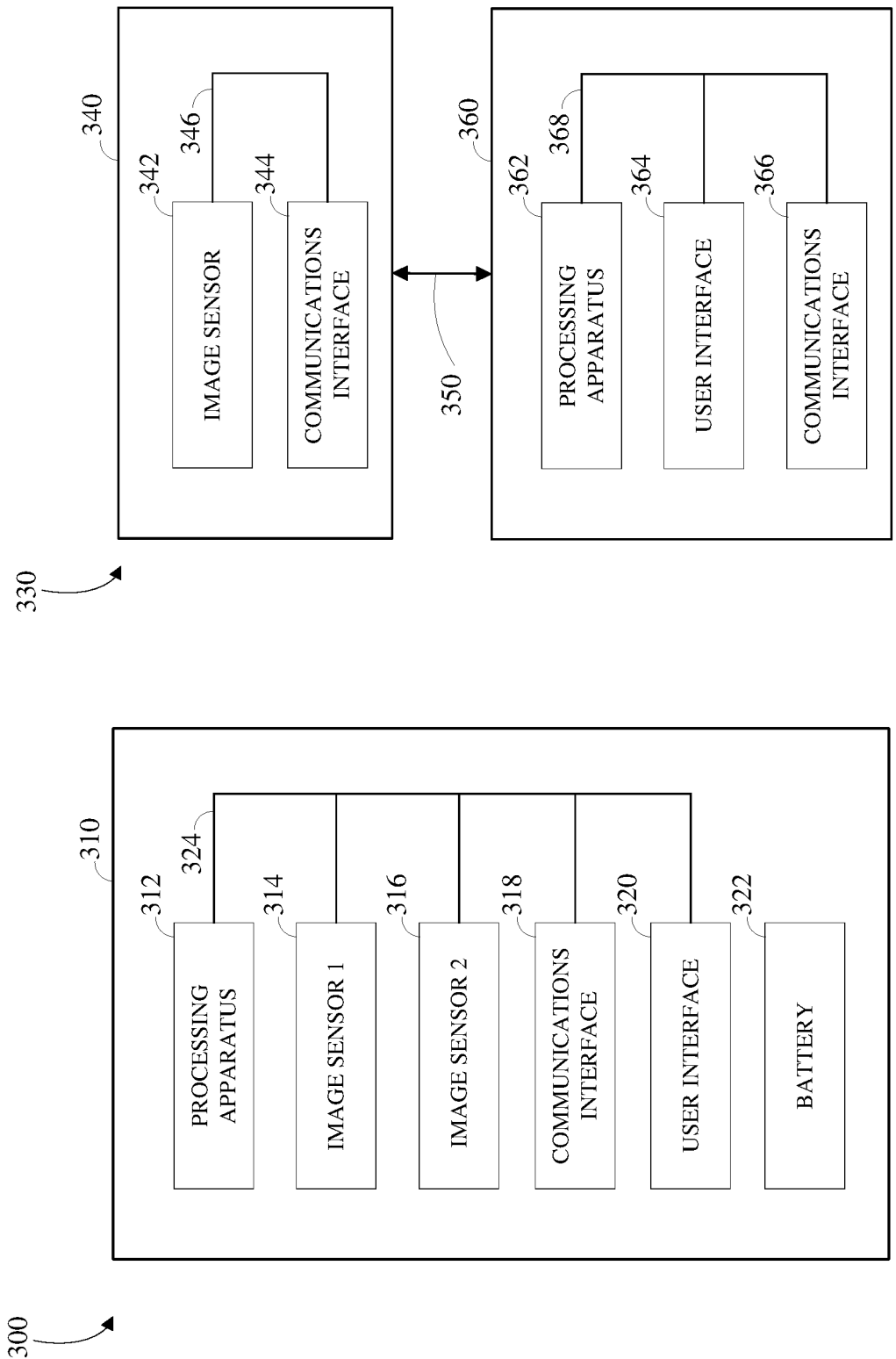

WATERPROOF SHOT AND ZOOM BUTTON

CROSS-REFERENCE TO RELATED APPLICATIONS

This application is a continuation of U.S. application Ser. No. 17/145,522, filed Jan. 11, 2021, which claims benefit to U.S. Provisional Application No. 62/960,315, filed on Jan. 13, 2020, all of which are incorporated by reference in their entirety.

TECHNICAL FIELD

This disclosure relates generally to a user interface of an image capture device for use in connection with the operation of one or more features of the image capture device.

BACKGROUND

Image capture devices are used in various applications, including, for example, handheld cameras and video recorders, drones, and vehicles, and may be adapted for use in connection with a wearable support, such as a vest, glove, helmet, hat, etc., or may simply be carried by a user. Image capture devices typically include one or more user interfaces, such as buttons, that are used to operate various features, such as image capture or image zoom. When image capture devices are exposed to underwater environments, external water pressure can act on sensitive internal switches that govern such operation, causing inadvertent actuation. For example, in the context of shutter actuation, inadvertent operation can render an image capture device unusable in that the shutter may remain perpetually open until the external water pressure is relieved. Buttons requiring a high peak, or activation, force can be used to combat this issue by requiring a user to apply a force to the buttons greater than the external water pressure to actuate an imaging feature; however, such buttons can reduce sensitivity of imaging feature actuation and can reduce the overall usability of the image capture device.

SUMMARY

Disclosed herein are implementations of an image capture device. In one implementation, the image capture device includes a housing that defines a cavity. The image capture device includes a user interface that covers the cavity and has interior and exterior surfaces. The user interface includes an actuation portion that is positioned on the exterior surface and receives an input command from a user. The user interface includes a protrusion that extends from the interior surface and actuates an imaging feature of the image capture device when an input command is received at the actuation portion. The actuation portion and the protrusion in combination prevent premature actuation of the imaging feature of the image capture device from hydrostatic pressure acting on the actuation portion.

In another implementation, an image capture device includes a housing that defines a cavity. The image capture device includes a cover positioned over the cavity, and the cover includes a user interface that extends over a portion of the cavity. The image capture device includes a switch positioned within the cavity and connected with a printed circuit board. The switch receives an input command for actuating an imaging feature of the image capture device when a user applies a force to the user interface. The image capture device includes a support member that extends from one of an interior surface of the cover or a surface of the cavity that is generally parallel to the cover, and the support member prevents actuation of the switch by hydrostatic pressure.

In another implementation, an image capture device includes a body that has a cavity and a cover that overlays the cavity. The cover includes a user interface that activates a switch positioned within the cavity, and the switch actuates an imaging feature of the image capture device when a user applies a force to the user interface. The image capture device includes compensation members positioned on opposing ends of the user interface, and the compensation members prevent actuation of the user interface by hydrostatic pressure acting on the cover.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
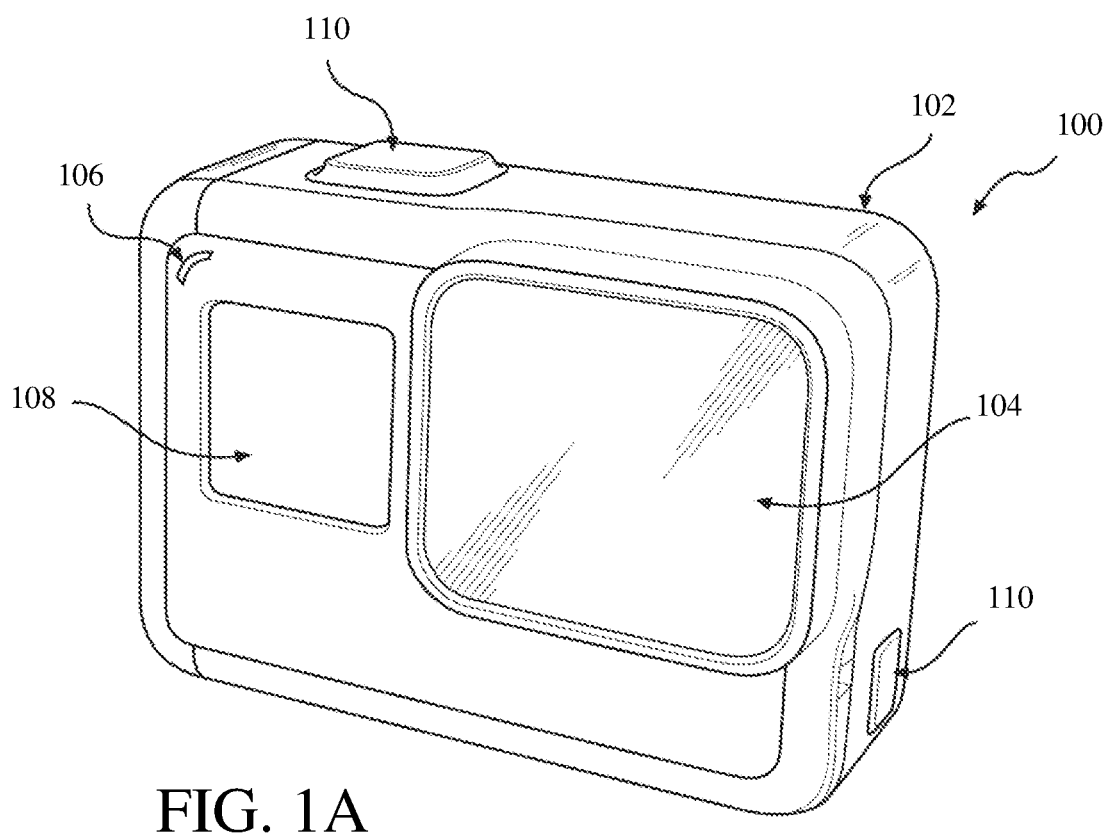
FIGS. 1A-D are isometric views of an example of an image capture device.

User interfaces that can actuate imaging features of an image capture device are described here. User interfaces of image capture devices used in underwater environments can experience inadvertent actuation due to water pressure acting on the image capture device; this water pressure is also referred to as hydrostatic pressure. For example, hydrostatic pressure can act on buttons and/or sensitive internal switches that govern image device operation (e.g., shutter actuation or image zoom), causing inadvertent actuation. In the context of shutter actuation by hydrostatic pressure, inadvertent operation of the shutter can render an image capture device unusable in that the shutter may remain perpetually open until the hydrostatic pressure is relieved. Buttons requiring a high peak, or activation, force (e.g., 5N) can be used to counteract the action of hydrostatic pressure by requiring a user to apply a force to the buttons greater than the hydrostatic pressure to actuate an imaging feature. Such buttons can reduce sensitivity of imaging features and reduce the overall usability of the image capture device. For example, control of image zoom features often requires sensitive adjustment to achieve the zoom setting desired by the user. Buttons requiring a high peak force may not provide the level of sensitivity necessary for proper control of image zoom features. A user interface requiring a relatively low peak force that is designed to offset and/or account for hydrostatic pressure applied to an image capture device in an underwater environment would therefore be advantageous.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
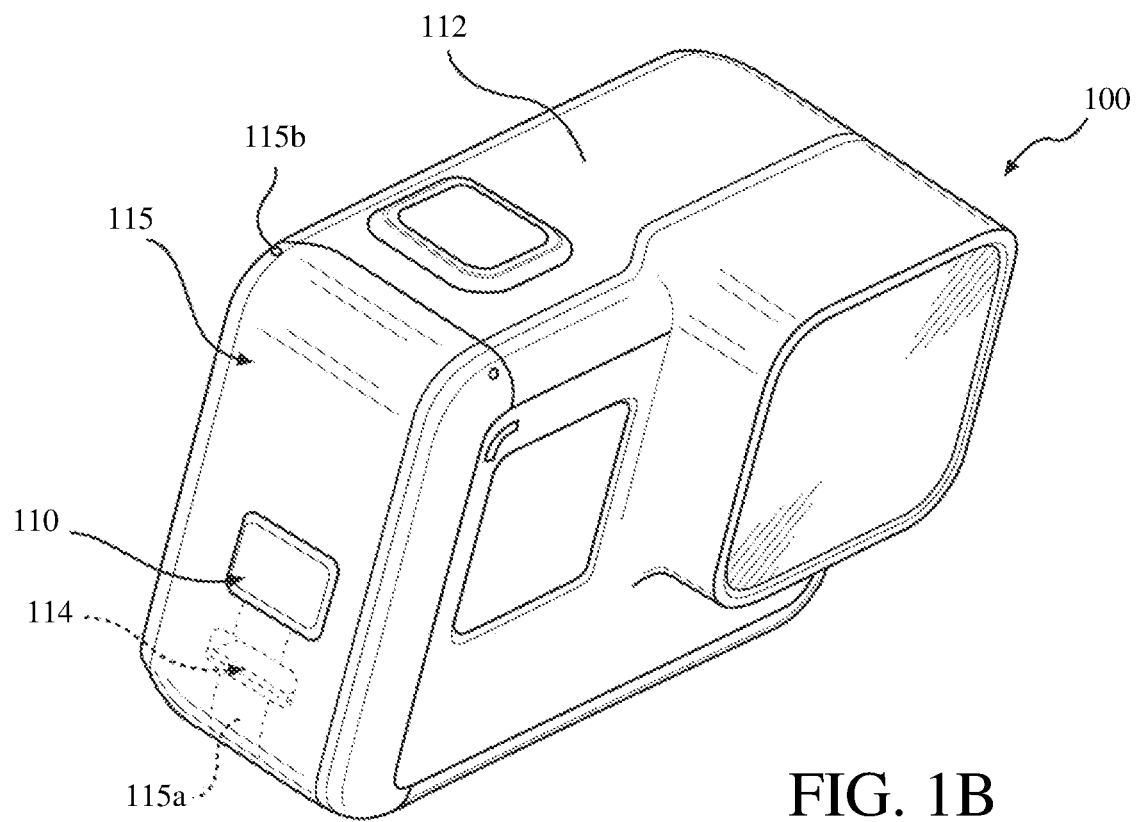
Figure 1C:
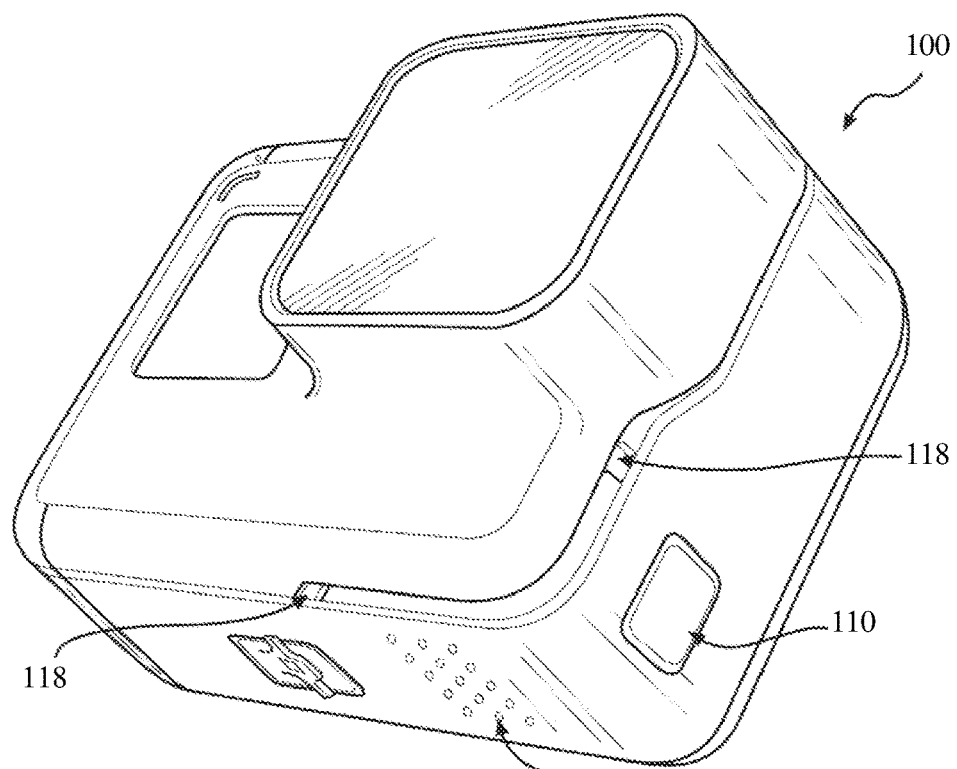
Figure 1D:
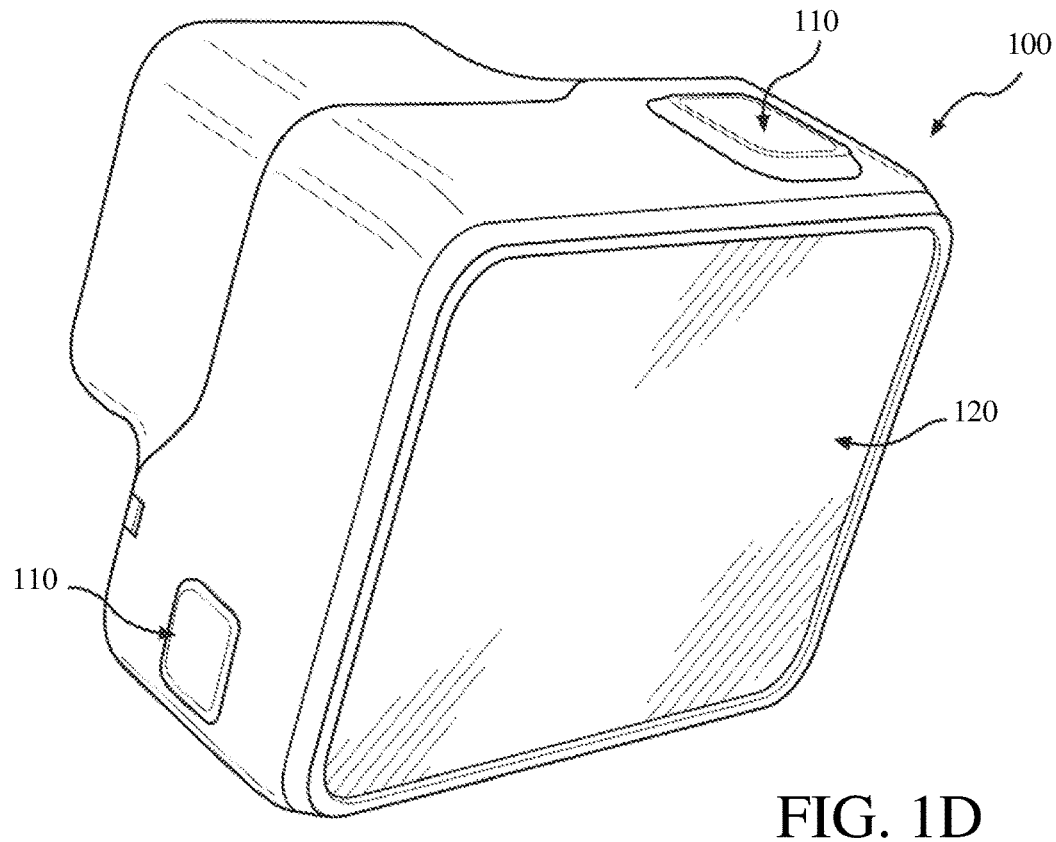

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 112 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
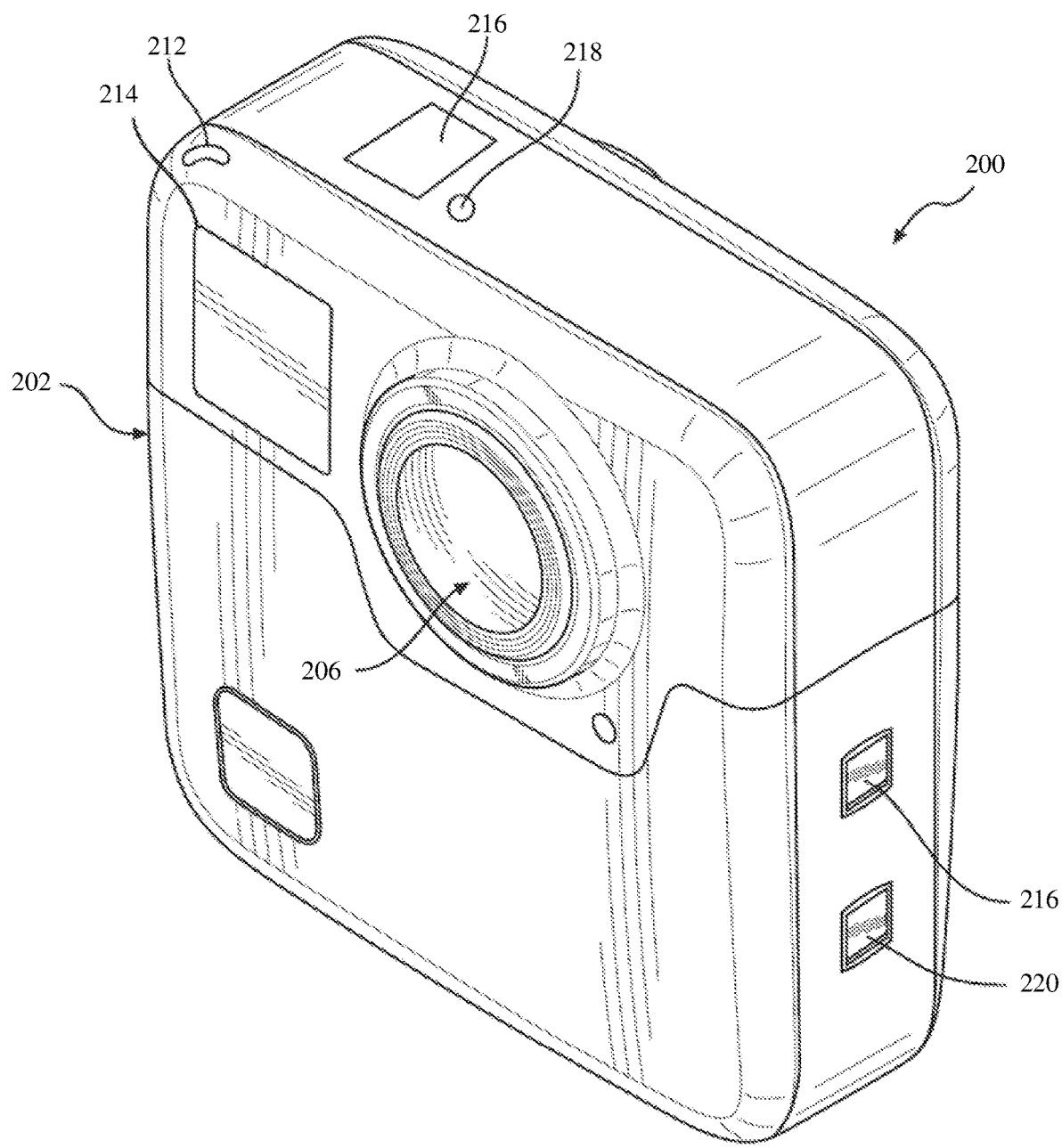
FIGS. 2A-B are isometric views of another example of an image capture device.
Figure 2B:
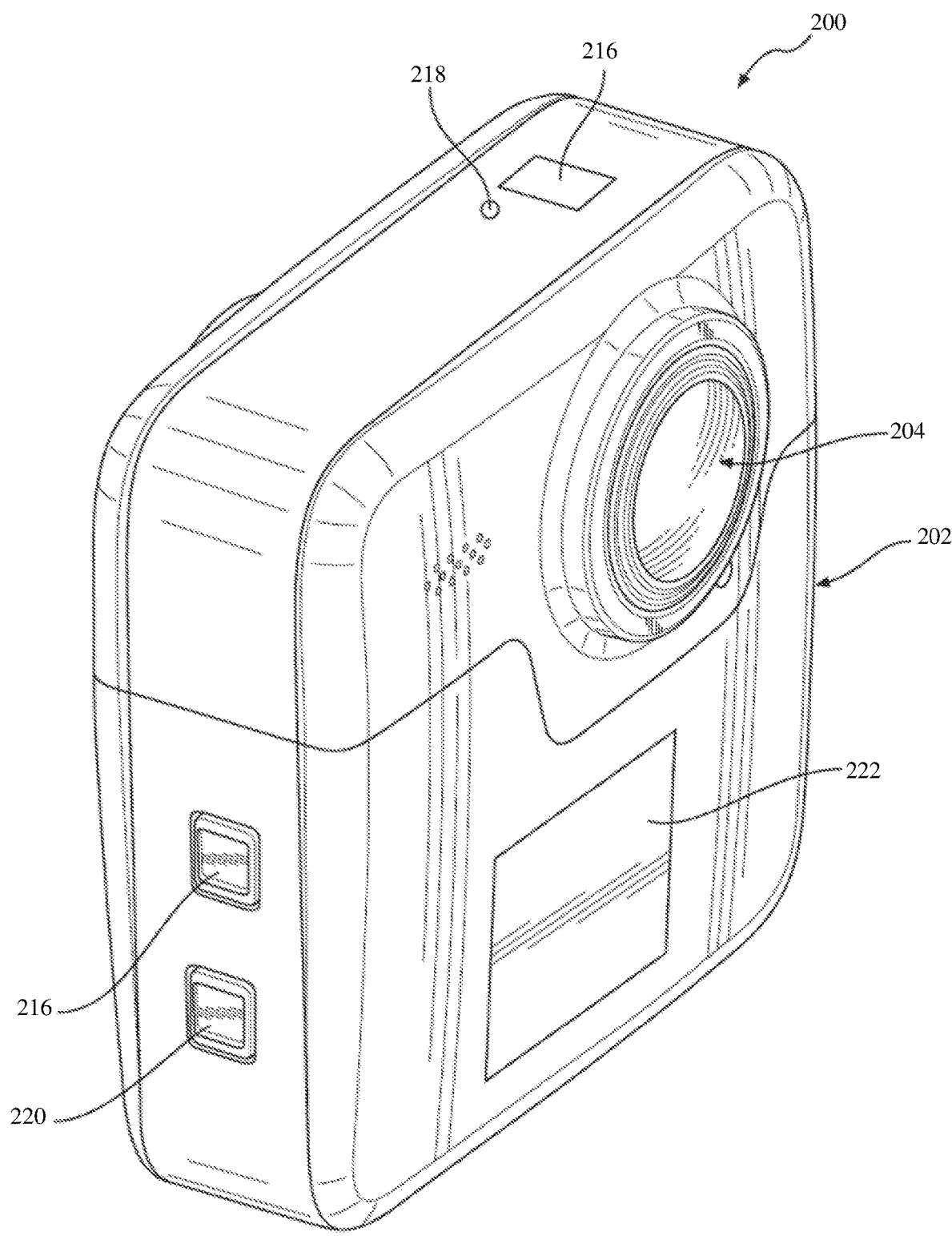

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
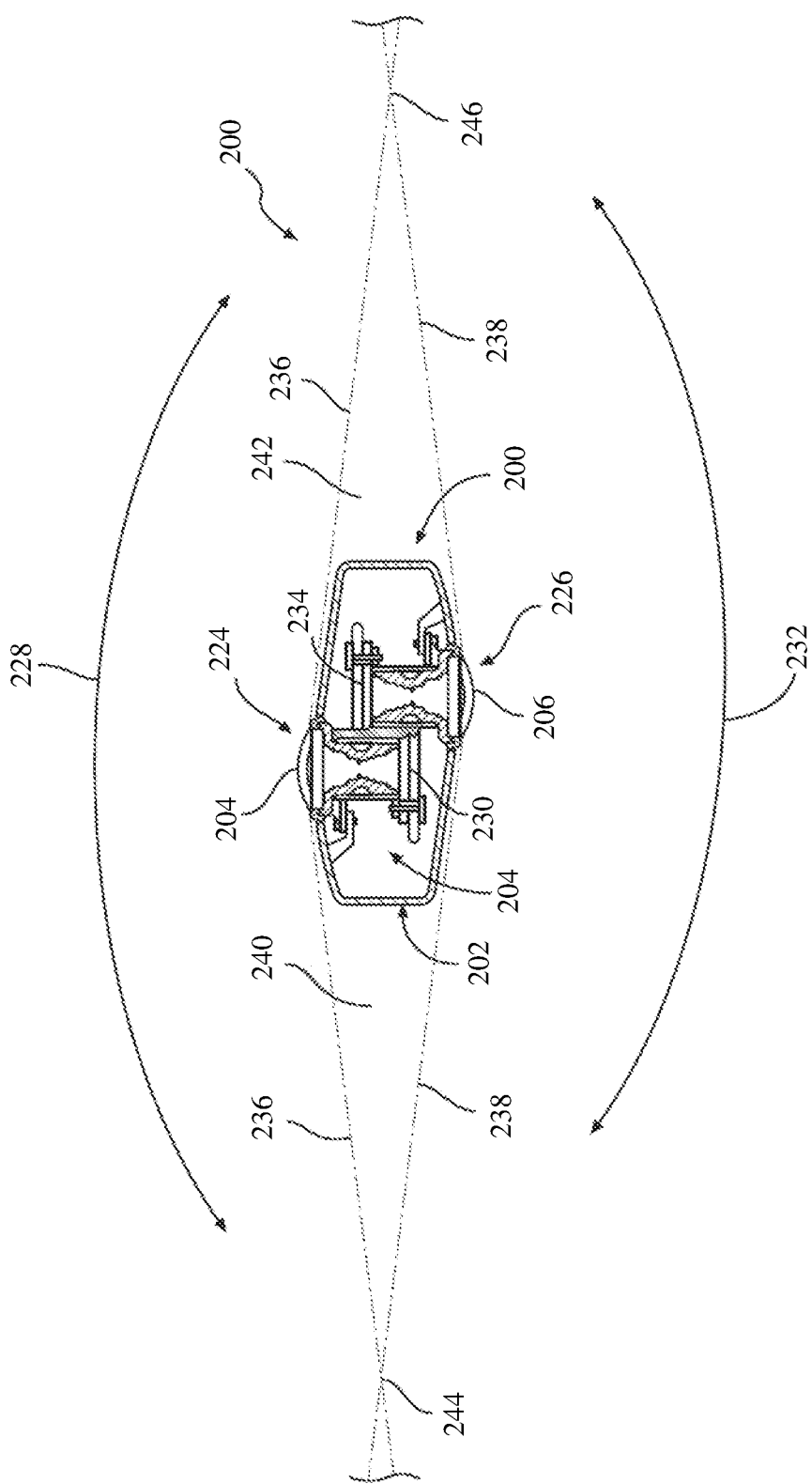
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random-access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be used to implement some or all of the techniques described in this disclosure.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off. In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure.

With reference now to FIGS. 4-7, a cover 400 is illustrated for use with an image capture device (e.g., the image capture device 100 of FIG. 1 or the image capture device 200 of FIG. 2A) to operate the image capture device and/or actuate imaging features of the image capture device. The imaging features may include digital data capture including, for example, images, video, and audio. The imaging features may also include an image zoom command such as image zoom in or image zoom out. Although shown throughout the figures and discussed herein in connection with shutter operation and image zoom, it should be appreciated that the cover 400 may be used in connection with the operation of a variety of functions, including, for example, powering the image capture device on and off, selecting between modes of operation, etc. Additionally, although the various image capture devices illustrated and described in relation to the cover 400 are shown as including a single cover 400 including one, two, or three user interfaces (e.g., buttons or rockers), it should be appreciated that the number of covers 400 and user interfaces included on the image capture device, and the location(s) of the cover 400 and user interfaces, may be varied in alternate embodiments of the present disclosure (e.g., the image capture device may include a cover 400 comprising more or less than two user interfaces or a plurality of covers 400 may be present in various locations on the image capture device).

Figure 4:
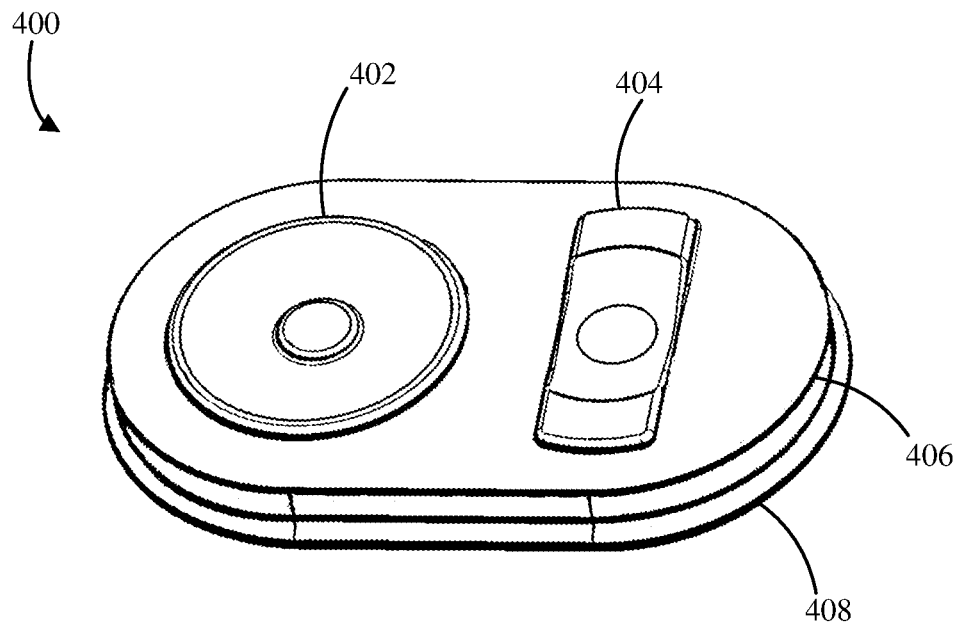
FIG. 4 is a top perspective view of a cover of an image capture device according to a first embodiment.

FIG. 4 is a top perspective view of the cover 400 of an image capture device (e.g., the image capture device 100 of FIG. 1 or the image capture device 200 of FIG. 2) according to a first embodiment. The cover 400 includes a first user interface 402 configured to receive a first user input to the image capture device. In the illustrated, non-limiting example, the first user interface 402 includes a push-button-type interface configured to receive an image capture command from the user by way of the user's finger. The cover 400 also includes a second user interface 404 configured to receive a second user input to the image capture device. In the illustrated, non-limiting example, the second user interface 404 includes a rocker-type interface configured to receive an image zoom-in command or an image zoom-out command from the user by way of the user's finger. In other embodiments, the first user interface 402 and the second user interface 404 may include detents, buttons, ridges, or rockers of any type configured to receive an input indicative of any imaging feature of the image capture device.

Figure 5:
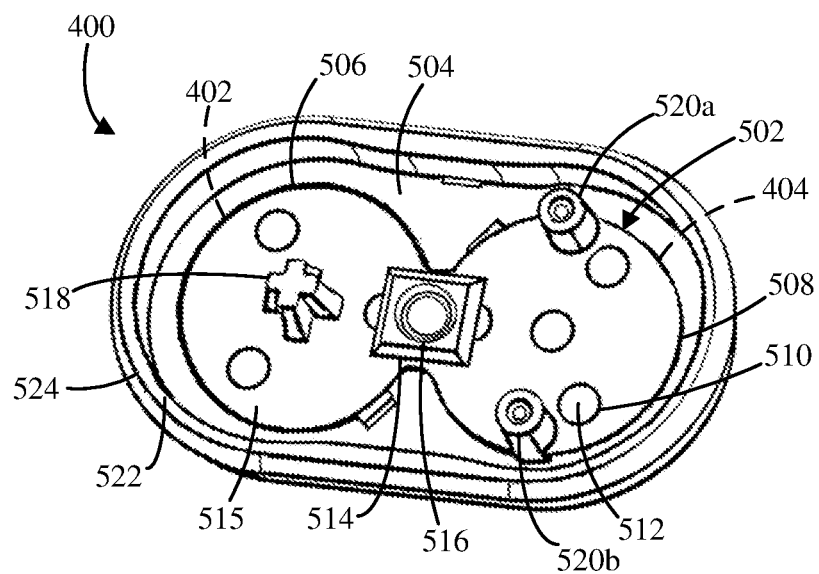
FIG. 5 is a bottom perspective view of the cover of FIG. 4.

The cover 400 is configured to enclose a cavity (FIGS. 6-7) defined by a housing of the image capture device and includes a peripheral wall 406. The peripheral wall 406 includes a protrusion 408 configured to be received by a groove 409 (FIG. 7) in the housing. A connection between the protrusion 408 and the groove 409 prevents water from entering the cavity. In other embodiments, the cover 400 may not include the peripheral wall 406 or the groove 409 and may be configured to enclose the cavity of the housing using any other suitable means, such as by adhesive between the cover 400 and the housing. In the example of FIGS. 4 and 5, the cover 400 has an ovular shape and is made of rubber. In other embodiments, the cover 400 may have a circular shape, a rectangular shape, or any other shape and may be made of plastic, composite, foam, or any other material suitable to receive a user input to the image capture device.

FIG. 5 is a bottom perspective view of the cover 400 of FIG. 4. A first frame 502 is coupled to an interior surface 504 of the cover 400. The first frame 502 may formed from a material more rigid than a material forming the cover 400. For example, the first frame 502 may be formed from plastic, aluminum, steel, or fiberglass. In other embodiments, the first frame 502 may be made of rubber or any other material that may have any rigidity relative to the cover 400. The cover 400 may be co-molded to the first frame 502. In other embodiments, the cover 400 may be attached to the first frame 502 using adhesive, interference fit, or any other suitable means. In yet other embodiments, the first frame 502 is integral with the cover 400.

The first user interface 402 extends across a first portion 506 of the first frame 502 and the second user interface 404 extends across a second portion 508 of the first frame 502. The first portion 506 and the second portion 508 have a circular shape, but in other embodiments may have a square shape, a rectangular shape, or any other shape. The first frame 502 includes apertures 510 through the first portion 506 and the second portion 508 that are configured to receive protrusions 512 extending from the interior surface 504 of the cover 400 in order to couple the cover 400 and the first frame 502. In other embodiments, the first frame 502 may not include the apertures 510 and the cover 400 may not include the protrusions 512.

Figure 6:
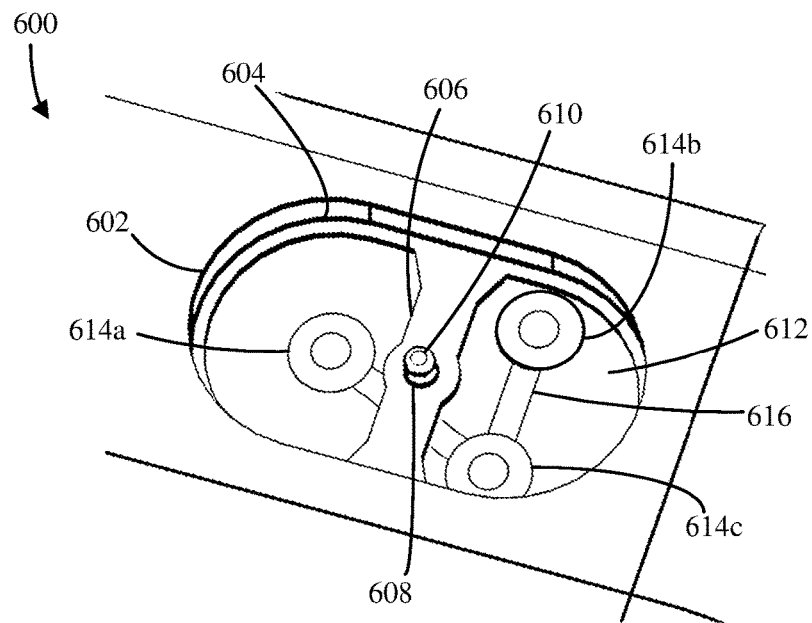
FIG. 6 is a top perspective view of an image capture device including a housing that defines a cavity enclosed by the cover of FIGS. 4-5.
Figure 7:
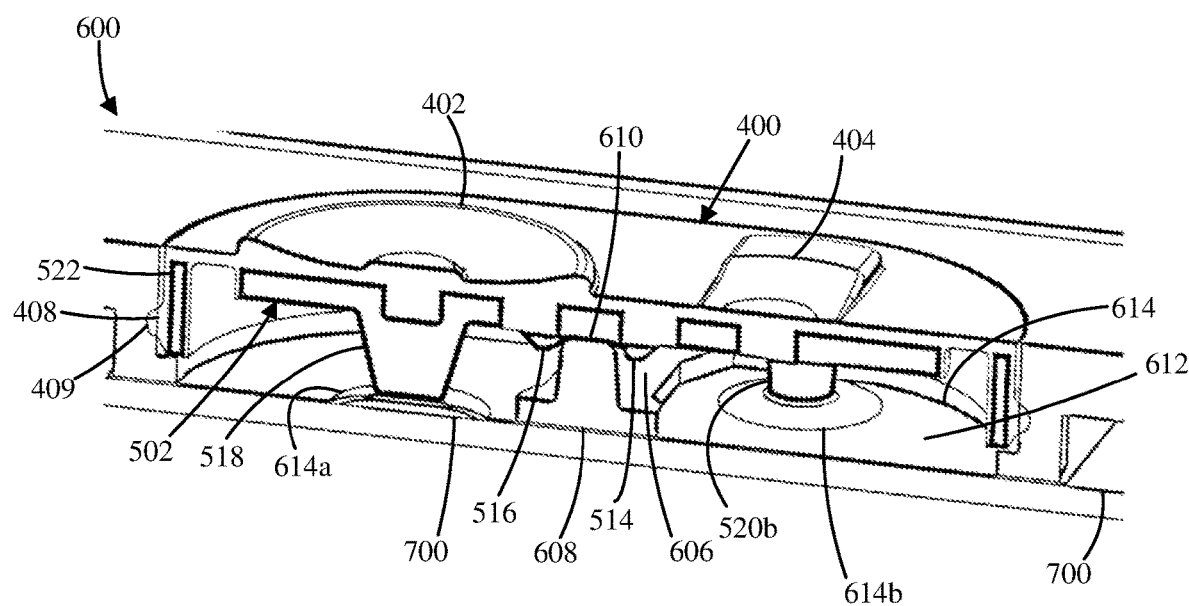
FIG. 7 is a cross-sectional view of the cover of FIGS. 4-5 and the image capture device of FIG. 6.

The first frame 502 includes a receiving member 514 extending from an interior surface 515 of the first frame 502 in a location between the first portion 506 and the second portion 508. The receiving member 514 defines a receptacle 516 configured to receive a support member (FIGS. 6-7). The receiving member 514 has a square shape in the example of FIG. 5, but in other embodiments may have a round shape, a rectangular shape, or any other shape. The receptacle 516 has a round shape in the example of FIG. 5, but in other embodiments may have a square shape, a rectangular shape, or any other shape. In some embodiments, the first frame 502 may not include the receiving member 514. In such embodiments, the first frame 502 may or may not define a receptacle having features similar to those of the receptacle 516 and the support member may be configured to directly contact the interior surface 515 of the first frame 502 without use of a receptacle.

The first portion 506 of the first frame 502 includes a first protrusion 518 extending from the interior surface 515 of the first frame 502. In the illustrated, non-limiting example, the first protrusion 518 has a cross-type shape, but in other embodiments the first protrusion 518 may have a round shape, a square shape, a rectangular shape, or any other shape. The first protrusion 518 is configured to cause actuation of an imaging feature (e.g., image capture) of the image capture device in response to receiving user input to the image capture device (e.g., a user pressing the first user interface 402). For example, in response to a user pressing the push-button-type interface of the first user interface 402, an end of the first protrusion 518 may contact a switch located on a PCB (not shown) located underneath the cover 400 to activate the switch and instigate the imaging feature of the image capture device.

The second portion 508 of the first frame 502 includes two second protrusions 520a,b extending from the interior surface 515 of the first frame 502. In the illustrated, non-limiting example, each of the second protrusions 520a,b has a round shape or a cylindrical shape, but in other embodiments, may have a square shape, a rectangular shape, or any other shape. The second protrusions 520a,b each define a recess on a distal end. In other embodiments, the second protrusions 520a,b may not define the recess. Each of the second protrusions 520a,b is configured to cause actuation of an imaging feature (e.g., one second protrusion 520a is configured to actuate an image zoom-in feature and the other second protrusion 520b is configured to actuate an image zoom-out feature) of the image capture device in response to receiving user input to the image capture device. For example, in response to a user pressing one end of the rocker-type interface of the second user interface 404, an end of the second protrusion 520a may contact a switch located on the PCB (not shown) located underneath the cover 400 to activate the switch and instigate the imaging feature of zoom in.

The cover 400 includes a second frame 522 coupled to the peripheral wall 406 of the cover 400. The second frame 522 may be formed from a material more rigid than the material forming the cover 400, such as plastic, aluminum, steel, or fiberglass. In other embodiments, the second frame 522 may have any rigidity relative to the cover 400. The second frame 522 may or may not include the same material as the first frame 502. In the illustrated, non-limiting example, the peripheral wall 406 defines a channel 524 shaped and sized to receive the second frame 522. In other embodiments, the cover 400 may not define the channel 524. The second frame 522 is shown in FIG. 5 as co-molded to the cover 400 but, in other embodiments, may be coupled to the cover 400 via interference fit, adhesive, or any other suitable means. In yet other embodiments, the second frame 522 is integral with the cover 400. The second frame 522 is configured to be received inside the cavity defined by the housing of the image capture device. In some embodiments, the cover 400 may not include the second frame 522, and any portion of the cover 400 may be configured to be received inside the cavity using any other suitable means, such as by adhesive between the cover 400 and the housing. In the example of FIGS. 4 and 5, the second frame 522 has an ovular shape, but in other embodiments, the second frame 522 may have a circular shape, a rectangular shape, or any other shape.

FIG. 6 is a top perspective view of a portion of an image capture device (e.g., such as the image capture devices 100, 200 of FIG. 1 or 2) including a housing 600 that defines a cavity 602 that can be enclosed by the cover 400 of FIGS. 4 and 5. FIG. 7 is a cross-sectional view of the cover 400 of FIGS. 4 and 5 as coupled to the housing 600 of FIG. 6. The housing 600 may include features similar to those of the body 102 of FIG. 1 and/or the body 202 of FIG. 2. The cavity 602 is shaped and sized to receive the cover 400 such that the cover 400 encloses the cavity 602.

In the illustrated, non-limiting example, the cavity 602 has an ovular shape, but in other embodiments, the cavity 602 may have a circular shape, a rectangular shape, or any other shape. The housing 600 includes a lip 604 extending around a periphery of a lower edge of the cavity 602. The lip 604 is configured to contact an edge or surface of the second frame 522 of the cover 400 (FIG. 5). In other embodiments, the housing 600 may not include the lip 604. The housing 600 includes a support beam 606 extending from one end of the cavity 602 to another end of the cavity 602. The support beam 606 extends laterally across the cavity 602, but in other embodiments, the support beam 606 may extend longitudinally across the cavity 602 or may extend across the cavity 602 in another orientation.

The housing 600 includes a support member 608 extending from the support beam 606. A distal end 610 of the support member 608 is configured to be received by the receptacle 516 in the receiving member 514 of the cover 400 (FIGS. 5, 7). The support member 608 has a round shape or a cylindrical shape, but in other embodiments, the support member 608 may have a square shape, a rectangular shape, or any other shape. In other embodiments, the housing 600 may not include the support beam 606. In such embodiments, the support member 608 may extend from another portion of the housing 600 or may extend from any other component of the image capture device beneath or proximate to the cover 400, such as from a PCB 700 (FIG. 7) disposed underneath the cover 400.

The image capture device includes an overlay 612 disposed beneath the cover 400. The overlay 612 is configured to extend across the PCB 700 located beneath the cover 400 and/or within the housing 600. The overlay 612 includes protrusions 614a,b,c extending from the overlay 612. In the non-limiting example shown in FIG. 6, the first protrusion 518 of the first frame 502 is configured to depress the protrusion 614a in response to the first user interface 402 receiving user input. In response to depression of the protrusion 614a, the protrusion 614a is configured to actuate a switch (not shown) on the PCB 700. The switch is configured to actuate an imaging feature of the image capture device. The second protrusions 520a,b of the first frame 502 are each configured to depress one of the protrusions 614b,c in response to the second user interface 404 receiving user input to one of the rocker-type interfaces. In response to depression of the protrusions 614b,c, the protrusions 614b,c are configured to actuate additional switches (not shown) on the PCB 700. The additional switches are configured to actuate additional imaging features of the image capture device, such as zoom-in and zoom-out features.

The overlay 612 defines channels 616 along the overlay 612 between the protrusions 614a,b,c. The channels 616 prevent movement of one protrusion 614a,b,c, from causing movement of another protrusion 614a,b,c. The protrusions 614a,b,c have a dome shape and may have a diameter between 3 mm and 6 mm, such as 4 mm or 5 mm, but in other embodiments may have any suitable diameter. The protrusions 614a,b,c may also have a square shape, a rectangular shape, or any other shape. The overlay 612 can be made of PET film and can have a thickness between 0.04 mm and 0.08 mm, such as 0.05 mm or 0.07 mm, but in other embodiments, the overlay 612 may have any suitable thickness and be made of plastic, rubber, or any other suitable material. The overlay 612 may be coupled to the PCB 700 using adhesive, fasteners, plastic welding, or using any other means. In some embodiments, the image capture device may not include the overlay 612. In such embodiments, the first protrusion 518 and the second protrusions 520a,b may directly contact switches (not shown) on the PCB 700 when the respective user interfaces 402, 404 are actuated by user inputs.

As shown in FIG. 7, contact between the support member 608 and the receiving member 514 can prevent movement of the first user interface 402 and the second user interface 404 beyond a predetermined threshold when the housing 600 of the image capture device is under hydrostatic pressure. For example, when the image capture device is located in an underwater environment, water surrounding the image capture device applies hydrostatic pressure equally across the cover 400. As the cover 400 is flexible or pressable so as to receive user inputs via the first and second user interfaces 402, 404, the hydrostatic pressure can move at least a portion of the cover 400 into the cavity 602 such that the support member 608 contacts the receiving member 514 inside the receptacle 516. Because the hydrostatic pressure is applied equally to the cover 400 on both sides of the support member 608, the frame 502 is prevented from rotating relative to the distal end 610 of the support member. While the hydrostatic pressure is applied to the image capture device, a stiffness of the first frame 502 and the support member 608 can enable the support member 608 to prevent the first and second protrusions 518, 520a,b of the first frame 502 from depressing the protrusions 614a,b,c of the overlay 612 and, thus, prevent the hydrostatic pressure from initiating imaging features.

When the image capture device including the housing 600 and the cover 400 is under hydrostatic pressure, the user may still actuate an imaging feature in the underwater environment by pressing the push-button-type interface of the first user interface 402 or one end of the rocker-type interface of the second user interface 404. For example, in response to the user pressing the push-button-type interface of the first user interface 402 with a force greater than the hydrostatic pressure, the first frame 502 rotates about the distal end 610 of the support member 608 such that the first protrusion 518 contacts the protrusion 614a of the overlay 612. In another example, in response to the user pressing one end of the rocker-type interface of the second user interface 404 with a force greater than the hydrostatic pressure, the first frame 502 rotates about the distal end 610 of the support member 608 such that one of the second protrusions 520a,b contacts one of the protrusions 614b,c of the overlay 612.

In the configuration for the cover 400 shown and described in reference to FIGS. 4-7, the first user interface 402 and the second user interface 404 can be designed with a peak force requirement for actuation between 1.5 N and 2.5 N and a travel between 0.15 mm to 0.25 mm. Travel indicates a distance that the first user interface 402 and/or the second user interface 404 must be moved to actuate a switch to implement an imaging feature of the image capture device. In other embodiments, the first and second user interfaces 402, 404 can include any suitable peak force and any suitable travel to meet design constraints of the given image capture device.

The support member 608 may also function to prevent cross-pressing of the first user interface 402 and the second user interface 404 and/or to prevent actuation of two imaging features simultaneously. For example, if the user presses the push-button-type interface of the first user interface 402, the first frame 502 rotates about the distal end 610 of the support member 608 such that the first portion 506 moves into the cavity 602 and the first protrusion 518 contacts the protrusion 614a of the overlay 612 to actuate an imaging feature. At the same time, the second portion 508 of the first frame 502 also moves away from the cavity 602, and the second protrusions 520a,b are prevented from contacting the protrusions 614b,c of the overlay 612 and from actuating another imaging feature. The stiffness of the first frame 502 and the contact between the support member 608 and the receptacle 516 of the receiving member 514 of the first frame 502 enables this rocking or titling action of the first frame 502 to occur. In other words, cross-pressing of the first and second user interfaces 402, 404 is prevented by tilting or rocking of the first frame 502 about the support member 608.

Figure 8:
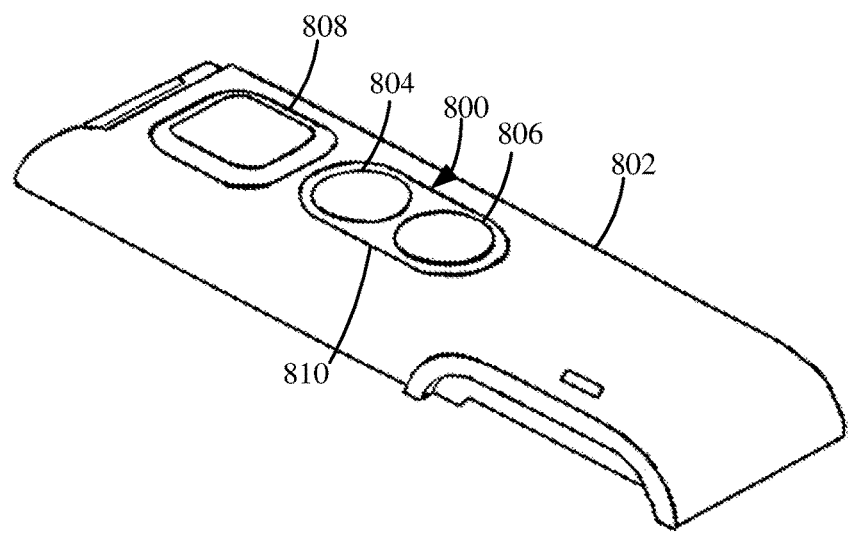
FIG. 8 is a top perspective view of a portion of an image capture device including a cover according to a second embodiment.
Figure 9:
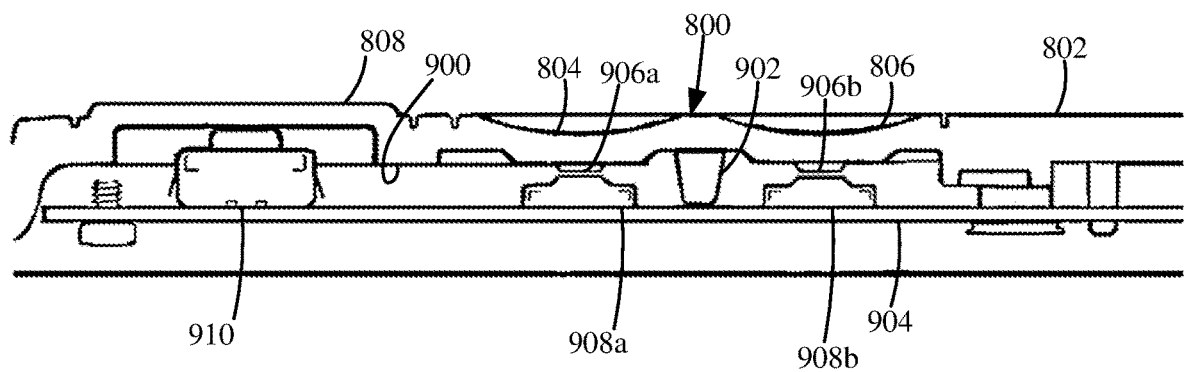
FIG. 9 is a cross-sectional view of the cover and a portion of the image capture device of FIG. 8.

FIG. 8 is a top perspective view of a cover 800 coupled to a portion of a housing 802 of an image capture device (e.g., the image capture device 100 of FIG. 1 or the image capture device 200 of FIG. 2) according to a second embodiment. FIG. 9 is a cross-sectional view of the cover 800 and the housing 802 of FIG. 8. The cover 800 is configured to enclose a cavity 900 (FIG. 9) defined by the housing 802. The cover 800 includes features similar to those of the cover 400 of FIGS. 4 and 5 except as otherwise described. The housing 802 includes features similar to those of the housing 600 of FIGS. 6 and 7, except as otherwise described.

The cover 800 includes a first user interface 804 configured to receive a first user input to the image capture device. In the illustrated, non-limiting example, the first user interface 804 includes a push-button-type interface configured to receive a zoom-in or zoom-out command from the user. The cover 800 includes a second user interface 806 configured to receive a second user input to the image capture device. In the illustrated, non-limiting example, the second user interface 806 includes another push-button-type interface configured to receive a zoom-in or zoom-out command from the user. In the embodiment shown in FIGS. 8-9, the image capture device includes a third user interface 808 configured to receive a third user input to the image capture device. In the illustrated, non-limiting example, the third user interface 808 includes a push-button-type interface configured to receive an image capture command from the user. The third user interface 808 is separated from the cover 800 by a portion of the housing 802. In other embodiments, the cover 800 may include the third user interface 808.

A pliable portion 810 extends between the cover 800 and the housing 802. The pliable portion 810 is configured to enable the cover 800 to move relative to the housing 802. The pliable portion 810 may be made of rubber, plastic, or any other suitable material. The cover 800 is formed from a material more rigid than a material forming the pliable portion 810. For example, the cover 800 may be formed from plastic, aluminum, steel, or fiberglass. In other embodiments, the cover 800 may be made of rubber or any other material that may have an increased rigidity relative to the pliable portion 810.

The first user interface 804 and the second user interface 806 each include a protrusion 906*a,b* extending from an interior surface of the cover 800. The protrusions 906*a,b* are configured to cause actuation of an imaging feature (e.g., zoom in or zoom out) in response to receiving a user input to the image capture device. For example, in response to the user pressing the push-button-type interface of the first user interface 804 or the second user interface 806, an end of one of the protrusions 906*a,b* depresses a respective switch 908*a,b* located on a PCB 904 within the housing 802. The switches 908*a,b* are each configured to actuate an imaging feature of the image capture device. In some embodiments, an overlay (not shown) having features similar to the overlay 612 of FIGS. 6 and 7 may extend over the switches 908*a,b* and the PCB 904.

As shown in FIG. 9, a support member 902 extends from an interior surface of the cover 800, through the cavity 900, to a distal end of the support member 902. The support member 902 extends from the interior surface of the cover 800 at a location between the first user interface 804 and the second user interface 806. The distal end of the support member 902 is configured to contact the PCB 904. Contact between the support member 902 and the PCB 904 prevents movement of the first user interface 804 and/or the second user interface 806 beyond a predetermined threshold when the image capture device is under hydrostatic pressure. In other embodiments, the PCB 904 may include a receiving member having a receptacle with features similar to those of the receiving member 514 and the receptacle 516 of FIG. 5. In yet other embodiments, the support member 902 may be configured to contact a portion of the housing 802 within the cavity 900. In such embodiments, the housing 802 may include a receiving member and a receptacle having features similar to those of the receiving member 514 and the receptacle 516 of FIG. 5.

When the image capture device is located in an underwater environment, water surrounding the image capture device applies hydrostatic pressure equally across the cover 800, moving at least a portion of the cover 800 into the cavity 900 such that the distal end of the support member 902 contacts the PCB 904. Because the hydrostatic pressure is applied equally to the cover 800 on both sides of the support member 902, the cover 800 is prevented from rotating relative to the distal end of the support member 902. The protrusions 906*a,b* are therefore prevented from depressing the switches 908*a,b* and from initiating imaging features.

When the image capture device including the housing 802 and the cover 800 is under hydrostatic pressure, the user may still actuate an imaging feature in the underwater environment by pressing the push-button-type interface of the first user interface 804 or the push-button-type interface of the second user interface 806. For example, when the user presses the push-button-type interface of the first user interface 804 with a force greater than the hydrostatic pressure, the cover 800 rotates relative to the distal end of the support member 902 such that the protrusion 906*a* depresses the switch 908*a* and initiates an imaging feature. In another example, when the user presses the push-button-type interface of the second user interface 806 with a force greater than the hydrostatic pressure, the cover 800 rotates relative to the distal end of the support member 902 such that the protrusion 906*b* depresses the switch 908*b* and initiates an imaging feature.

The support member 902 may also function to prevent cross-pressing of the first user interface 804 and the second user interface 806 and/or to prevent actuation of two imaging features simultaneously. For example, if the user presses the push-button-type interface of the first user interface 804, the cover 800 rotates relative to the distal end of the support member 902 and a portion of the first user interface 804 will move into the cavity 900 such that the protrusion 906*a* depresses the switch 908*a*. The second user interface 806 will also move away from the cavity 900 such that the protrusion 906*b* is prevented from depressing the switch 908*b*.

The third user interface 808 is separated from the first and second user interfaces 804, 806 by a portion of the housing 802 such that movement of the third user interface 808 does not cause movement of the first or second user interfaces 804, 806. This feature prevents cross-pressing of the third user interface 808 and the first and second user interfaces 804, 806. An interior surface of third user interface 808 is configured to actuate a switch 910 on the PCB 904 in response to the third user interface 808 receiving a user input to the image capture device. The switch 910 is configured to actuate an imaging feature of the image capture device (e.g., image capture). To prevent the switch 910 from being actuated in an underwater environment due to hydrostatic pressure applied to the third user interface 808, the switch 910 may be designed to require a higher peak force for actuation than is required for actuation of the switches 908a,b, that is, a peak force greater than the hydrostatic pressure applied to the third user interface 808 is required to actuate the switch 910. The switch 910 may be actuated in an underwater environment in response to the user applying a force greater than the hydrostatic pressure to the third user interface 808. In other embodiments, the third user interface 808 may include a protrusion configured to actuate the switch 910 in response to the third user interface 808 receiving a user input.

In the example where the switches 908a,b are associated with zoom-in and zoom-out features and the switch 910 is associated with an image capture feature, having a lower peak force requirement for actuation of the switches 908a,b than for actuation of the switch 910 allows for a more delicate adjustment to be performed for the zoom-in and zoom-out features. In other words, use of more sensitive switches 908a,b protected from actuation by hydrostatic pressure using the support member 902 allows for improved underwater function of zoom-in and zoom-out features that require more tuning or have more settings than, for example, the image-capture feature associated with the switch 910 which may have a single setting or actuation level.

Figure 10:
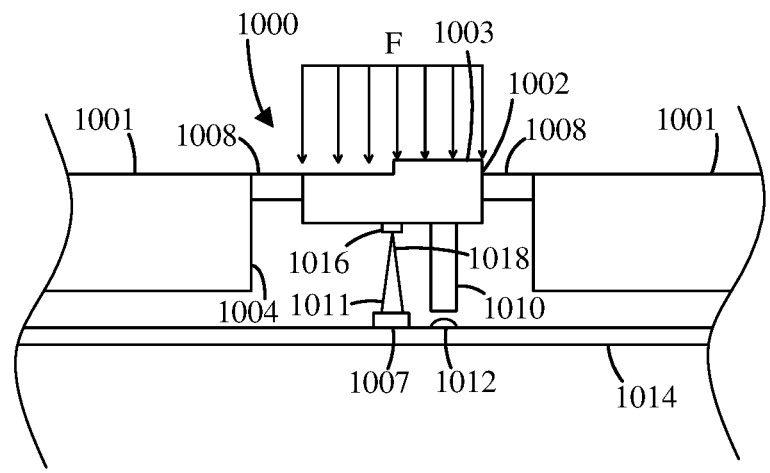
FIG. 10 is a cross-sectional view of a portion of an image capture device including a cover according to a third embodiment.

FIG. 10 is a side cross-sectional view of a cover 1000 coupled to a portion of a housing 1001 of an image capture device (e.g., the image capture device 100 of FIG. 1 or the image capture device 200 of FIG. 2) according to a third embodiment. The cover 1000 has features similar to those of cover 400 of FIGS. 4 and 5 except as otherwise described. The cover 1000 includes a user interface 1002 configured to receive a user input to the image capture device. In the illustrated, non-limiting example, the user interface 1002 includes an actuation portion 1003 extending from an exterior surface of the cover 1000. The user interface 1002 including the actuation portion 1003 functions as push-button-type interface configured to receive an image capture command from the user.

The cover 1000 is configured to enclose a cavity 1004 defined by the housing 1001. The housing 1001 includes features similar to those of the housing 600 of FIGS. 6 and 7 except as otherwise described. The housing 1001 includes a support beam 1007 within the cavity 1004 having features similar to those of the support beam 606 of FIGS. 6 and 7. The cover 1000 includes a pliable portion 1008 extending from the user interface 1002 to the housing 1001. The pliable portion 1008 is configured to enable movement of the user interface 1002 relative to the housing 1001. The pliable portion 1008 may be formed from rubber, plastic, or any other suitable material. The user interface 1002 is formed from a material more rigid than the material forming the pliable portion 1008. For example, the user interface 1002 may be formed from plastic, aluminum, steel, or fiberglass. In other embodiments, the user interface 1002 may be formed from rubber or any other material that may have an increased rigidity relative to the pliable portion 1008.

The user interface 1002 includes a protrusion 1010 extending from an interior surface of the user interface 1002 at a location proximate an edge of the user interface 1002. The protrusion 1010 is configured to cause actuation of an imaging feature (e.g., image capture) in response to the user interface 1002 receiving a user input to the image capture device at the actuation portion 1003. For example, in response to the user pressing the actuation portion 1003 of the user interface 1002, an end of the protrusion 1010 depresses a switch 1012 located on a PCB 1014 within the housing 1001. The switch 1012 is configured to actuate an imaging feature of the image capture device. In some embodiments, an overlay (not shown) having features similar to the overlay 612 of FIGS. 6 and 7 may extend over the switch 1012 and the PCB 1014.

A receiving member 1016 extends from the interior surface of the user interface 1002 at a location near or at the center of the user interface 1002. The actuation portion 1003 extends from an exterior surface of the user interface 1002 between the receiving member 1016 and the pliable portion 1008 as shown in FIG. 10. The receiving member 1016 includes features similar to those of the receiving member 514 of FIGS. 4 and 5 except as otherwise described. In other embodiments, the receiving member 1016 can be located in another position on the interior surface of the user interface 1002.

A support member 1011 extends from the support beam 1007, through the cavity 1004, to a distal end 1018 of the support member 1011. The distal end 1018 of the support member 1011 is configured to be received by the receiving member 1016 of the cover 1000. Contact between the support member 1011 and the receiving member 1016 prevents movement of the user interface 1002 beyond a predetermined threshold when the image capture device is under hydrostatic pressure. For example, when the image capture device is located in an underwater environment, hydrostatic pressure (illustrated in FIG. 10 with arrows F) is applied equally across the user interface 1002. Because the hydrostatic pressure is applied equally to the user interface 1002 on both sides of the support member 1011 while the support member 1011 contacts the receiving member 1016, the protrusion 1010 is prevented from depressing the switch 1012 and from initiating an imaging feature. In other embodiments, the support member 1011 may extend from the interior surface of the cover 1000 and the receiving member 1016 may extend from the support beam 1007.

The user may actuate an imaging feature while the image capture device is located in an underwater environment by pressing the actuation portion 1003 of the user interface 1002 with a force greater than that generated by hydrostatic pressure. For example, in response to the user pressing the actuation portion 1003 with a force greater than that generated by hydrostatic pressure, the user interface 1002 rotates relative to the distal end 1018 of the support member 1011 such that the protrusion 1010 depresses the switch 1012.

Figure 11:
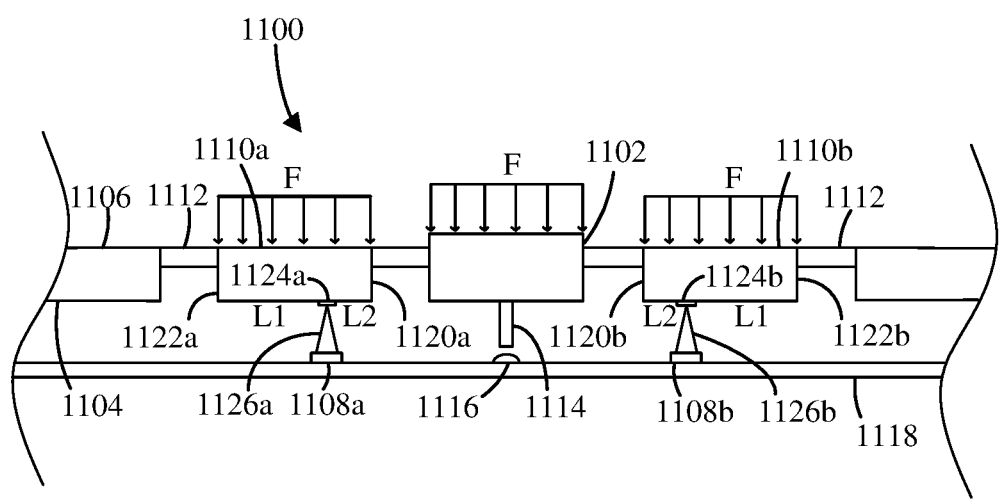
FIG. 11 is a cross-sectional view of a portion of an image capture device including a cover according to a fourth embodiment.

FIG. 11 is a side cross-sectional view of a cover 1100 coupled to a portion of a housing 1106 of an image capture device (e.g., the image capture device 100 of FIG. 1 or the image capture device 200 of FIG. 2) according to a fourth embodiment. The cover 1100 includes features similar to those of the cover 1000 of FIG. 10 except as otherwise described. The cover 1100 includes a user interface 1102 configured to receive a user input to the image capture device. In the illustrated, non-limiting example, the user interface 1102 includes a push-button-type interface configured to receive an image capture command from the user.

The cover 1100 is configured to enclose a cavity 1104 defined by the housing 1106. The housing 1106 includes features similar to those of the housing 600 of FIGS. 6 and 7 except as otherwise described. The housing 1106 includes two support beams 1108a,b within the cavity 1104 having features similar to those of the support beam 606 of FIGS. 6 and 7. The cover 1100 includes two compensation members 1110a,b located on opposing sides of the user interface 1102 such that each of the compensation members 1110a,b is located between the user interface 1102 and the housing 1106. Each compensation member 1110a,b is configured to prevent movement of the user interface 1102 beyond a predetermined threshold when the image capture device is under hydrostatic pressure (denoted by forces labeled F in FIG. 11).

The cover 1100 includes a pliable portion 1112 having features similar to those of the pliable portion 1008 of FIG. 10 except as otherwise described. The pliable portion 1112 extends between the compensation members 1110a,b, the user interface 1102, and the housing 1106. The pliable portion 1112 enables movement of the compensation members 1110a,b and the user interface 1102 relative to the housing 1106. The user interface 1102 and the compensation members 1110a,b are formed from a material more rigid than the material forming the pliable portion 1112. For example, the user interface 1102 and the compensation members 1110a,b may be formed from plastic, aluminum, steel, or fiberglass. In other embodiments, the user interface 1102 and the compensation members 1110a,b may be made of rubber or any other material that may have any rigidity relative to the pliable portion 1112.

A portion of the user interface 1102 is configured to extend above the pliable portion 1112, the compensation members 1110a,b, and/or the housing 1106 to indicate to the user which area of the cover 1100 is configured to be pressed to initiate an imaging feature. The pliable portion 1112 and/or the compensation members 1110a,b may be configured to appear uniform with the housing 1106 to remain aesthetically hidden from the user. The user interface 1102 includes a protrusion 1114 extending from an interior surface of the user interface 1102. The protrusion 1114 is located at a center of the user interface 1102. In other embodiments, the protrusion 1114 may be located at another location on the interior surface of the user interface 1102. The protrusion 1114 is configured to cause actuation of an imaging feature (e.g., image capture) in response to the user interface 1102 receiving user input to the image capture device. For example, in response to the user pressing the push-button-type interface of the user interface 1102, an end of the protrusion 1114 contacts a switch 1116 located on a PCB 1118 within the housing 1106. The switch 1116 is configured to actuate an imaging feature of the image capture device. In some embodiments, an overlay (not shown) having features similar to the overlay 612 of FIGS. 6 and 7 may extend over the switch 1116 and the PCB 1118.

Each of the compensation members 1110a,b includes a first edge 1120a,b proximate to the user interface 1102 and a second edge 1122a,b distal to the user interface 1102. Each of the compensation members 1110a,b includes a receiving member 1124a,b extending from the interior surface of the respective compensation member 1110a,b. The receiving members 1124a,b include features similar to those of the receiving member 514 of FIG. 5 except as otherwise described. On each of the compensation members 1110a,b, the respective receiving member 1124a,b is located closer to the first edge 1120a,b than the second edge 1122a,b. For example, a distance L1 (FIG. 11) between the receiving member 1124a,b and the second edge 1122a,b of each compensation member 1110a,b may be twice a length of a distance L2 (FIG. 11) between the respective receiving member 1124a,b and the respective first edge 1120a,b.

Support members 1126a,b extend from each of the support beams 1108a,b, through the cavity 1104, to distal ends. The support members 1126a,b have features similar to those of the support member 608 of FIGS. 6 and 7 except as otherwise described. The distal end of each support member 1126a,b is configured to be received by one of the receiving members 1124a,b. Contact between the respective support members 1126a,b and receiving members 1124a,b prevents movement of the user interface 1102 beyond a predetermined threshold when the image capture device is under hydrostatic pressure.

In an underwater environment, hydrostatic pressure (illustrated in FIG. 11 with arrows F) is applied equally across the cover 1100, including across the compensation members 1110a,b and the user interface 1102. Due to the location of the receiving members 1124a,b and the support members 1126a,b relative to the compensation members 1110a,b and the uniform distribution of force from hydrostatic pressure, the second edges 1122a,b of the compensation members 1110a,b will move into the cavity 1104 in response to the hydrostatic pressure. In response to the movement of the second edges 1122a,b into the cavity 1104, the first edges 1120a,b of the compensation members 1110a,b move out of the cavity 1104 based on the compensation members 1110a,b pivoting about the support members 1126a,b. The user interface 1102 is coupled to the first edges 1120a,b of the compensation members 1110a,b via the pliable portion 1112. Therefore, in response to the movement of the first edges 1120a,b of the compensation members 1110a,b out of the cavity 1104, the user interface 1102 also moves out of the cavity 1104. Given this reaction to hydrostatic pressure, the protrusion 1114 extending from the interior surface of the user interface 1102 is prevented from depressing the switch 1116 on the PCB 1118.

While under hydrostatic pressure, the user may actuate an imaging feature of the image capture device by pressing the push-button-type interface of the user interface 1102. For example, in response to a user pressing the user interface 1102 with a force greater than the force generated by hydrostatic pressure, the user interface 1102 and the protrusion 1114 move into the cavity 1104. The protrusion 1114 then depresses the switch 1116 on the PCB 1118 and initiates an imaging feature.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
a housing that defines a cavity; and
a user interface that covers the cavity and has interior and exterior surfaces, the user interface comprising:
an actuation portion that is positioned on the exterior surface and configured to receive an input command from a user; and
a protrusion that extends from the interior surface and is configured to actuate an imaging feature of the image capture device when an input command is received at the actuation portion,
wherein the actuation portion and the protrusion in combination are configured to prevent premature actuation of the imaging feature of the image capture device from hydrostatic pressure acting on the actuation portion.

2. The image capture device of claim of claim 1, wherein the protrusion is configured to actuate the imaging feature at a switch positioned on and/or connected with a printed circuit board disposed within the cavity of the housing.

3. The image capture device of claim 1, wherein a force of the input command is greater than a force associated with the hydrostatic pressure.

4. The image capture device of claim 1, wherein the actuation portion is configured as a push button that receives the input command from the user.

5. The image capture device of claim 1, wherein the user interface comprises a lower portion on the exterior surface that is staggered with respect to the actuation portion so that the lower portion is closer to the cavity of the housing.

6. The image capture device of claim 5, wherein the actuation portion extends away from the user interface along a vertical axis, and wherein the protrusion extends from the user interface along the vertical axis so that when a force is applied against the actuation portion, the force acts on the protrusion to move the protrusion along the vertical axis to interface with and actuate the imaging feature.

7. The image capture device of claim 6, further comprising:
a support member that extends from a base of the cavity into contact with the interior surface of the user interface, the support member configured to physically support the user interface to prevent actuation of the imaging feature by the hydrostatic pressure.

8. The image capture device of claim 7, wherein the support member is configured to contact the interior surface of the user interface at a location opposite relative to where the lower portion and the actuation portion contact so that the user input for the actuation portion causes the user interface to rotate over the support member.

9. The image capture device of claim 5, wherein confirming the input command at the lower portion does not trigger the protrusion to actuate the imaging feature of the image capture device.

10. An image capture device, comprising:
a housing that defines a cavity;
a cover positioned over the cavity, the cover comprising a user interface that extends over a portion of the cavity;
a switch positioned within the cavity, connected with a printed circuit board, and configured to receive an input command for actuating an imaging feature of the image capture device when a user applies a force to the user interface; and
a support member that extends from one of an interior surface of the cover or a surface of the cavity that is generally parallel to the cover, the support member configured to prevent actuation of the switch by hydrostatic pressure.

11. The image capture device of claim 10, further comprising:
a protrusion that extends from the user interface towards the switch, the protrusion configured to actuate the switch when the user applies the force to the user interface.

12. The image capture device of claim 11, wherein the support member is configured to prevent contact of the protrusion and the switch when a force is not applied by the user to the user interface.

13. The image capture device of claim 11, wherein the support member and the protrusion extend from the cover in a generally parallel orientation with respect to each other.

14. The image capture device of claim 10, wherein the support member extends from a pliable portion of the cover that is different from the user interface.

15. The image capture device of claim 10, wherein the support member extends from a surface of the cavity that is generally parallel with respect to the cover.

16. An image capture device, comprising:
a body comprising a cavity; and
a cover that overlays the cavity, the cover comprising:
a user interface configured to activate a switch positioned within the cavity, the switch configured to actuate an imaging feature of the image capture device when a user applies a force to the user interface; and
compensation members positioned on opposing ends of the user interface, the compensation members configured to prevent actuation of the user interface by hydrostatic pressure acting on the cover.

17. The image capture device of claim 16, wherein the cover further comprises:
support members that extend from a base of the cavity toward the cover, the support members configured to prevent premature actuation of the user interface by hydrostatic pressure by physically supporting the compensation members.

18. The image capture device of claim 16, wherein without the force applied by the user to the user interface, the compensation members and user interface are generally coplanar, and wherein the cover further comprises pliable portions that separate the compensation members and the user interface so that applying the force to the user interface causes the user interface to move towards a base of the cavity so that the switch is activated and the compensation members and the user interface are not generally coplanar.

19. The image capture device of claim 18, wherein the pliable portions separate the compensation members and/or the user interface from the body.

20. The image capture device of claim 16, wherein the user interface further comprises:
a protrusion that extends from the user interface towards the switch, the protrusion configured to activate the switch when the force is applied to the user interface by the user.

* * * * *